US012690617B2

(12) United States Patent
Garcia Garcia

(10) Patent No.: US 12,690,617 B2
(45) Date of Patent: Jul. 28, 2026

(54) AEROSOL GENERATING DEVICE AND AN AEROSOL GENERATING SYSTEM

(71) Applicant: JT International SA, Geneva (CH)

(72) Inventor: Eduardo Jose Garcia Garcia, Grand-Saconnex (CH)

(73) Assignee: JT International SA, Geneva (CH)

( * ) Notice: Subject to any disclaimer, the term of this patent is extended or adjusted under 35 U.S.C. 154(b) by 373 days.

(21) Appl. No.: 18/274,114

(22) PCT Filed: Jan. 26, 2022

(86) PCT No.: PCT/EP2022/051701

§ 371 (c)(1),
(2) Date: Jul. 25, 2023

(87) PCT Pub. No.: WO2022/167276

PCT Pub. Date: Aug. 11, 2022

(65) Prior Publication Data

US 2024/0260668 A1 Aug. 8, 2024

(30) Foreign Application Priority Data

Feb. 2, 2021 (EP) .................................... 21154670

(51) Int. Cl.
*A24F 40/465* (2020.01)
*A24F 40/20* (2020.01)
*H05B 6/10* (2006.01)

(52) U.S. Cl.
CPC ............ *A24F 40/465* (2020.01); *A24F 40/20* (2020.01); *H05B 6/105* (2013.01); *H05B 2206/022* (2013.01)

(58) Field of Classification Search
CPC ............................... A24F 40/20; A24F 40/465
See application file for complete search history.

(56) References Cited

U.S. PATENT DOCUMENTS

2017/0055574 A1* 3/2017 Kaufman ............... H05B 6/105
2019/0124979 A1 5/2019 Sebastian et al.
2019/0230987 A1* 8/2019 Wu .......................... H05B 6/36
(Continued)

FOREIGN PATENT DOCUMENTS

EP 2797445 A1 11/2014
EP 3469936 A2 4/2019
(Continued)

OTHER PUBLICATIONS

Suzuki, Akihiko, WO2016208760A1, "Method for Producing Atomization Unit, and Atomization Unit", machine translation, Dec. 29, 2016. (Year: 2016).*
(Continued)

*Primary Examiner* — Michael H. Wilson
*Assistant Examiner* — Stephanie Lynn Moore
(74) *Attorney, Agent, or Firm* — Lerner David LLP

(57) ABSTRACT

An aerosol generating device includes a heating chamber for receiving at least part of an aerosol generating substrate and a plurality of inductively heatable susceptors spaced around a periphery of the heating chamber. An aerosol generating system is also provided herein. The aerosol generating system includes the aerosol generating device in combination with an aerosol generating substrate.

17 Claims, 6 Drawing Sheets

(56) References Cited

U.S. PATENT DOCUMENTS

| | | | | |
|---|---|---|---|---|
| 2019/0230989 | A1* | 8/2019 | Fursa | A24F 40/485 |
| 2022/0295894 | A1* | 9/2022 | Batista | A24F 40/465 |

FOREIGN PATENT DOCUMENTS

| | | | |
|---|---|---|---|
| JP | 2019134701 | A | 8/2019 |
| JP | 2023551209 | A | 12/2023 |
| WO | 2020074595 | A1 | 4/2020 |
| WO | 2020216762 | A1 | 10/2020 |
| WO | 2021037824 | A1 | 3/2021 |
| WO | 2022112112 | A1 | 6/2022 |

OTHER PUBLICATIONS

International Search Report for PCT/EP2022/051701 mailed Apr. 19, 2022. 4 pages.

* cited by examiner

AEROSOL GENERATING DEVICE AND AN AEROSOL GENERATING SYSTEM

CROSS-REFERENCE TO RELATED APPLICATIONS

The present application is a national phase entry under 35 U.S.C. § 371 of International Application No. PCT/EP2022/051701, filed Jan. 26, 2022, published in English, which claims priority to European Application No. 21154670.0 filed Feb. 2, 2021, the disclosures of which are incorporated herein by reference.

TECHNICAL FIELD

The present disclosure relates generally to an aerosol generating device, and more particularly to an aerosol generating device for heating an aerosol generating substrate to generate an aerosol for inhalation by a user. Embodiments of the present disclosure also relate to an aerosol generating system comprising an aerosol generating device and an aerosol generating substrate. The present disclosure is particularly applicable to a portable (hand-held) aerosol generating device. Such devices heat, rather than burn, an aerosol generating substrate, e.g., tobacco or other suitable materials, by conduction, convention, and/or radiation to generate an aerosol for inhalation by a user.

TECHNICAL BACKGROUND

The popularity and use of reduced-risk or modified-risk devices (also known as aerosol generating devices or vapour generating devices) has grown rapidly in recent years as an alternative to the use of traditional tobacco products. Various devices and systems are available that heat or warm aerosol generating substances to generate an aerosol for inhalation by a user.

A commonly available reduced-risk or modified-risk device is the heated substrate aerosol generating device, or so-called heat-not-burn device. Devices of this type generate an aerosol or vapour by heating an aerosol generating substrate to a temperature typically in the range 150° C. to 300° C. Heating the aerosol generating substrate to a temperature within this range, without burning or combusting the aerosol generating substrate, generates a vapour which typically cools and condenses to form an aerosol for inhalation by a user of the device.

Currently available aerosol generating devices can use one of a number of different approaches to provide heat to the aerosol generating substrate. One such approach is to provide an aerosol generating device which employs an induction heating system. In such a device, an induction coil is provided in the device and an inductively heatable susceptor is provided to heat the aerosol generating substrate. Electrical energy is supplied to the induction coil when a user activates the device which in turn generates an alternating electromagnetic field. The susceptor couples with the electromagnetic field and generates heat which is transferred, for example by conduction, to the aerosol generating substrate and an aerosol is generated as the aerosol generating substrate is heated.

It is generally desirable to rapidly heat an aerosol generating substrate to, and to maintain the aerosol generating substrate at, a temperature sufficiently high to generate a vapour. The present disclosure seeks to provide an aerosol generating device which rapidly heats an aerosol generating substrate to a desired temperature, whilst at the same time maximising the energy efficiency of the device.

SUMMARY OF THE DISCLOSURE

According to a first aspect of the present disclosure, there is provided an aerosol generating device comprising:

- a heating chamber for receiving at least part of an aerosol generating substrate;
- a plurality of inductively heatable susceptors spaced around a periphery of the heating chamber.

According to a second aspect of the present disclosure, there is provided an aerosol generating system comprising:

- an aerosol generating substrate; and
- an aerosol generating device comprising:
  - a heating chamber for receiving at least part of the aerosol generating substrate; and
  - a plurality of inductively heatable susceptors spaced around a periphery of the heating chamber and around a periphery of the aerosol generating substrate for heating the aerosol generating substrate.

The aerosol generating device/system is configured to heat an aerosol generating substrate, without burning the aerosol generating substrate, to volatise at least one component of the aerosol generating substrate and thereby generate a heated vapour which cools and condenses to form an aerosol for inhalation by a user of the aerosol generating device/system. The aerosol generating device is typically a hand-held, portable, device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The aerosol generating device/system provides for rapid and controlled heating of the aerosol generating substrate, whilst at the same time maximising energy efficiency.

The heating chamber may comprise a chamber wall defining an interior volume of the heating chamber. The plurality of inductively heatable susceptors may be spaced around an inner surface of the chamber wall. The aerosol generating substrate is heated rapidly and uniformly by the inductively heatable susceptors.

The chamber wall may include a plurality of susceptor mounts formed in or on the inner surface for mounting the plurality of inductively heatable susceptors. The susceptor mounts facilitate mounting of the inductively heatable susceptors and, thus, the manufacture and assembly of the aerosol generating device can be simplified. One or more of the susceptor mounts may define an airflow channel through which air can flow from a first open end of the heating chamber to a second closed end of the heating chamber. The air is heated as it flows along the airflow channel(s), thereby enhancing convective heating of the aerosol generating substrate.

The chamber wall may include a coil support structure which may be formed in or on an outer surface for supporting an induction heating coil of an electromagnetic field generator. The coil support structure facilitates mounting of the induction heating coil and allows the induction heating coil to be positioned optimally with respect to the inductively heatable susceptors. The inductively heatable susceptors are, therefore, heated efficiently, thereby improving the energy efficiency of the aerosol generating device. The provision of the coil support structure also facilitates manufacture and assembly of the aerosol generating device.

The coil support structure may comprise a coil support groove. The coil support groove may extend helically around the outer surface of the chamber wall. The coil support groove is particularly suitable for receiving a helical induction heating coil. Thus, the helical induction heating coil may extend around the heating chamber. The induction heating coil may comprise a Litz wire or a Litz cable. It will, however, be understood that other materials could be used. The circular cross-section of a helical induction heating coil may facilitate the insertion of the aerosol generating substrate into the heating chamber and may ensure uniform heating of the inductively heatable susceptors and, thus, the aerosol generating substrate.

The induction heating coil may be arranged to operate in use with a fluctuating electromagnetic field having a magnetic flux density of between approximately 20 mT and approximately 2.0 T at the point of highest concentration.

The heating chamber may be substantially tubular and the inductively heatable susceptors may be spaced around the periphery of the substantially tubular heating chamber. The heating chamber may be substantially cylindrical and the inductively heatable susceptors may be circumferentially spaced around the substantially cylindrical heating chamber. Thus, the heating chamber may be configured to receive a substantially cylindrical aerosol generating substrate which may be advantageous as, often, aerosol generating substrates in the form of aerosol generating articles are packaged and sold in a cylindrical form.

The heating chamber may have a longitudinal axis defining a longitudinal direction. Each of the inductively heatable susceptors may be elongate in the longitudinal direction of the heating chamber. Each of the inductively heatable susceptors may have a length and a width and, in an embodiment, the length may be at least five times the width. The elongate inductively heatable susceptors are heated efficiently in the presence of an electromagnetic field and the elongate shape ensures that the aerosol generating substrate is heated rapidly and uniformly along its length. The energy efficiency of the aerosol generating device is thereby maximised.

At least one of the inductively heatable susceptors may have at least one inwardly extending portion that extends into the heating chamber from an inner surface of the chamber wall, for example to compress the aerosol generating substrate. Alternatively or in addition, the heating chamber may include a plurality of elongate support ribs spaced circumferentially around an inner surface of the chamber wall. The inwardly extending portion and/or the support ribs may form a friction fit with the aerosol generating substrate. In some embodiments, each of the plurality of inductively heatable susceptors may have one of said inwardly extending portions, and the plurality of inwardly extending portions and/or the support ribs may compress the aerosol generating substrate and may in particular form a friction fit with the aerosol generating substrate. The one or more inwardly extending portions and/or support ribs provide the heating chamber with a reduced cross-sectional area and thereby compress an aerosol generating substrate positioned, in use, in the heating chamber. By compressing the aerosol generating substrate, heat can be transferred more efficiently to the aerosol generating substrate and more rapid heating can be achieved, whilst at the same time maximising energy efficiency.

The heating chamber may comprise a substantially non-electrically conductive and non-magnetically permeable material. For example, the heating chamber may comprise a heat-resistant plastics material, such as polyether ether ketone (PEEK). The heating chamber itself is not heated by the induction coil during operation of the aerosol generating device, ensuring that energy input into the inductively heatable susceptors is maximised. This in turn helps to ensure that the energy efficiency of the device is maximised. The device also remains cool to the touch, ensuring that user comfort is maximised.

The inductively heatable susceptor may comprise a metal. The metal is typically selected from the group consisting of stainless steel and carbon steel. The inductively heatable susceptor could, however, comprise any suitable material including one or more, but not limited, of aluminium, iron, nickel, stainless steel, carbon steel, and alloys thereof, e.g. Nickel Chromium or Nickel Copper. With the application of an electromagnetic field in its vicinity, each inductively heatable susceptor generates heat due to eddy currents and magnetic hysteresis losses resulting in a conversion of energy from electromagnetic to heat.

The aerosol generating device may include a power source and controller, e.g., comprising control circuitry, which may be configured to operate at a high frequency. The power source and circuitry may be configured to operate at a frequency of between approximately 80 kHz and 1 MHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

The aerosol generating substrate may comprise any type of solid or semi-solid material. Example types of aerosol generating solids include powder, granules, pellets, shreds, strands, particles, gel, strips, loose leaves, cut filler, porous material, foam material or sheets. The aerosol generating substrate may comprise plant derived material and in particular, may comprise tobacco. It may advantageously comprise reconstituted tobacco, for example including tobacco and any one or more of cellulose fibres, tobacco stalk fibres and inorganic fillers such as $CaCO_3$.

Consequently, the aerosol generating device may be referred to as a "heated tobacco device", a "heat-not-burn tobacco device", a "device for vaporising tobacco products", and the like, with this being interpreted as a device suitable for achieving these effects. The features disclosed herein are equally applicable to devices which are designed to vaporise any aerosol generating substrate.

The aerosol generating substrate may form part of an aerosol generating article and may be circumscribed by a paper wrapper.

The aerosol generating article may be formed substantially in the shape of a stick, and may broadly resemble a cigarette, having a tubular region with an aerosol generating substrate arranged in a suitable manner. The aerosol generating article may include a filter segment, for example comprising cellulose acetate fibres, at a proximal end of the aerosol generating article. The filter segment may constitute a mouthpiece filter and may be in coaxial alignment with the aerosol generating substrate. One or more vapour collection regions, cooling regions, and other structures may also be included in some designs. For example, the aerosol generating article may include at least one tubular segment upstream of the filter segment. The tubular segment may act as a vapour cooling region. The vapour cooling region may advantageously allow the heated vapour generated by heating the aerosol generating substrate to cool and condense to form an aerosol with suitable characteristics for inhalation by a user, for example through the filter segment.

The aerosol generating substrate may comprise an aerosol-former. Examples of aerosol-formers include polyhydric alcohols and mixtures thereof such as glycerine or propylene glycol. Typically, the aerosol generating substrate may comprise an aerosol-former content of between approximately 5% and approximately 50% on a dry weight basis. In some embodiments, the aerosol generating substrate may comprise an aerosol-former content of between approximately 10% and approximately 20% on a dry weight basis, and possibly approximately 15% on a dry weight basis.

Upon heating, the aerosol generating substrate may release volatile compounds. The volatile compounds may include nicotine or flavour compounds such as tobacco flavouring.

DETAILED DESCRIPTION OF EMBODIMENTS

Embodiments of the present disclosure will now be described by way of example only and with reference to the accompanying drawings.

Figure 1:
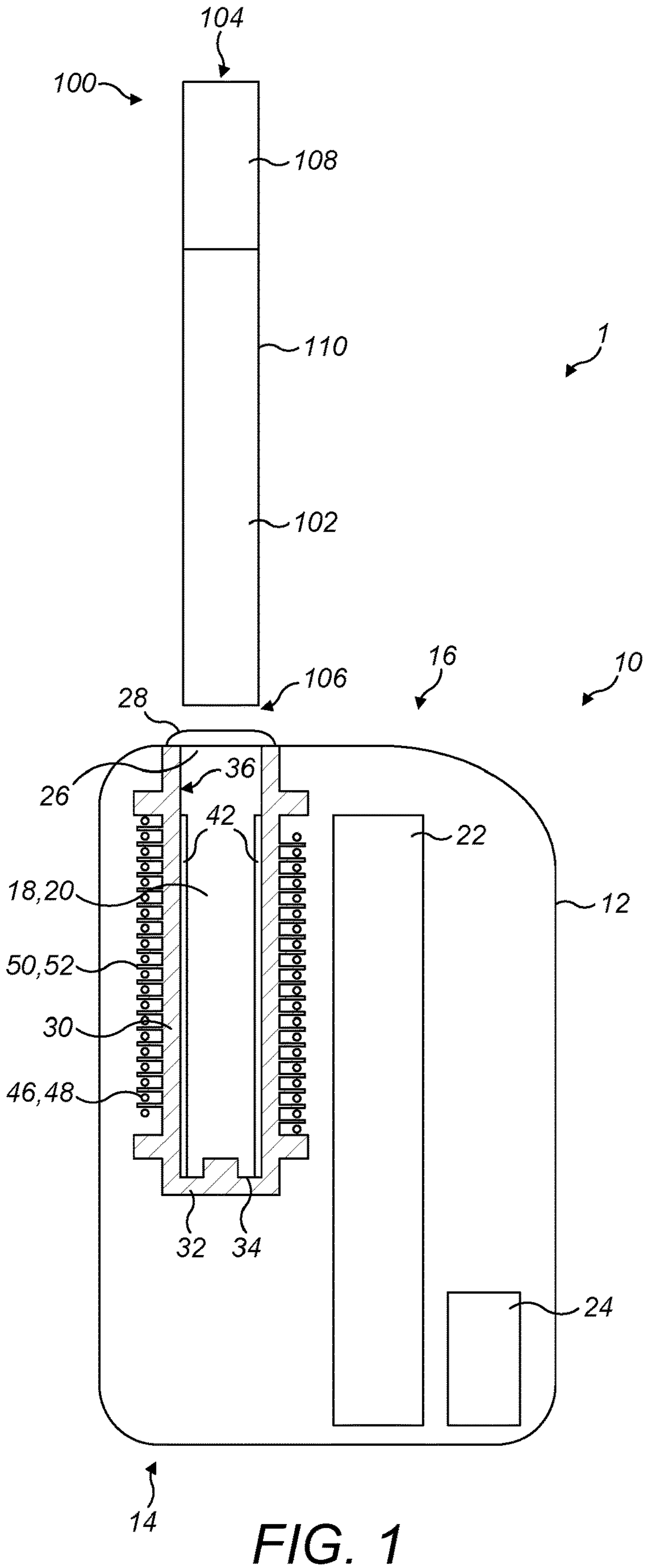
FIG. 1 is a diagrammatic cross-sectional view of an aerosol generating system comprising an aerosol generating device and an aerosol generating article ready to be positioned in a heating chamber of the aerosol generating device.
Figure 2:
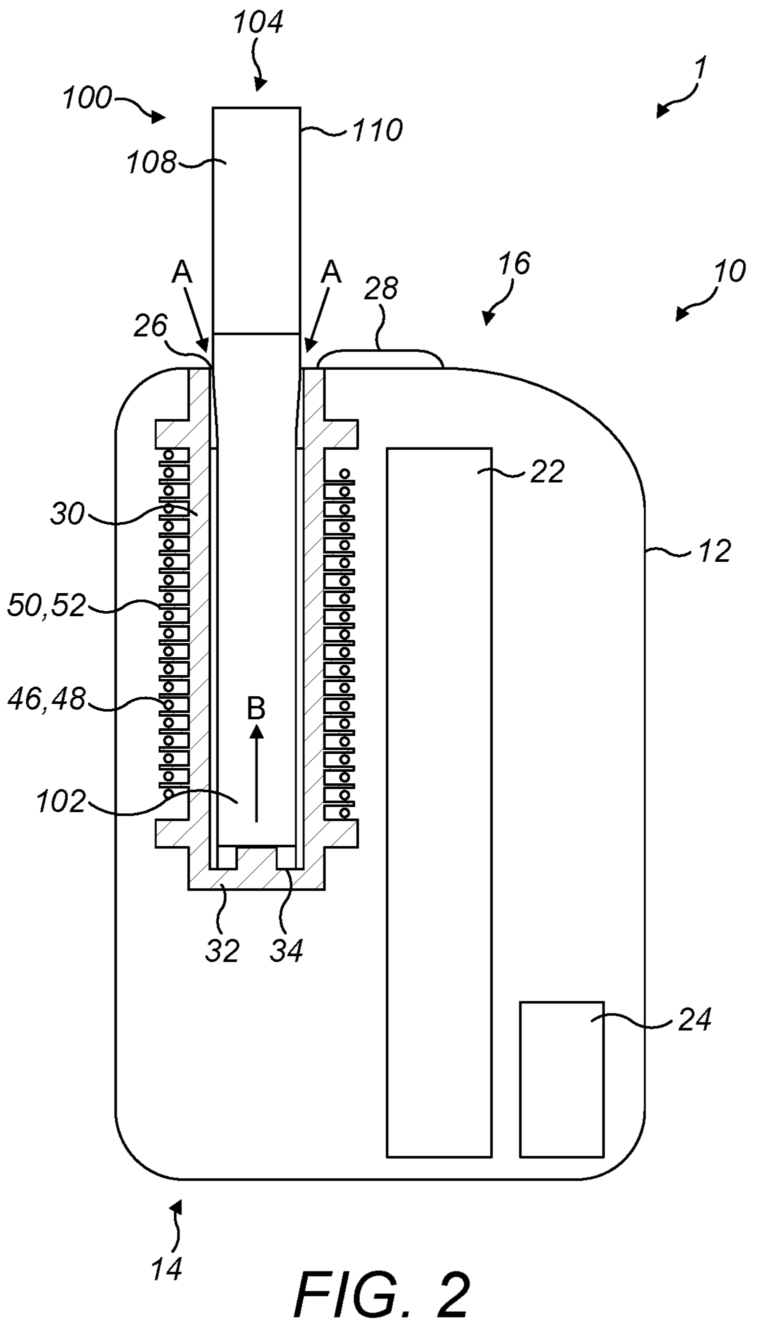
FIG. 2 is a diagrammatic cross-sectional view of the aerosol generating system of FIG. 1, showing the aerosol generating article positioned in the heating chamber of the aerosol generating device.

Referring initially to FIGS. 1 and 2, there is shown diagrammatically an example of an aerosol generating system 1. The aerosol generating system 1 comprises an aerosol generating device 10 and an aerosol generating article 100 for use with the device 10. The aerosol generating device 10 comprises a main body 12 housing various components of the aerosol generating device 10. The main body 12 can have any shape that is sized to fit the components described in the various embodiments set out herein and to be comfortably held by a user unaided, in a single hand.

A first end 14 of the aerosol generating device 10, shown towards the bottom of FIGS. 1 and 2, is described for convenience as a distal, bottom, base or lower end of the aerosol generating device 10. A second end 16 of the aerosol generating device 10, shown towards the top of FIGS. 1 and 2, is described as a proximal, top or upper end of the aerosol generating device 10. During use, the user typically orients the aerosol generating device 10 with the first end 14 downward and/or in a distal position with respect to the user's mouth and the second end 16 upward and/or in a proximate position with respect to the user's mouth.

The aerosol generating device 10 comprises a heating chamber 18 positioned in the main body 12. The heating chamber 18 defines an interior volume in the form of a cavity 20 having a substantially cylindrical cross-section for receiving an aerosol generating article 100. The heating chamber 18 has a longitudinal axis defining a longitudinal direction and is formed of a heat-resistant plastics material, such as polyether ether ketone (PEEK). The aerosol generating device 10 further comprises a power source 22, for example one or more batteries which may be rechargeable, and a controller 24.

The heating chamber 18 is open towards the second end 16 of the aerosol generating device 10. In other words, the heating chamber 18 has an open first end 26 towards the second end 16 of the aerosol generating device 10. The heating chamber 18 is typically held spaced apart from the inner surface of the main body 12 to minimise heat transfer to the main body 12.

The aerosol generating device 10 can optionally include a sliding cover 28 movable transversely between a closed position (see FIG. 1) in which it covers the open first end 26 of the heating chamber 18 to prevent access to the heating chamber 18 and an open position (see FIG. 2) in which it exposes the open first end 26 of the heating chamber 18 to provide access to the heating chamber 18. The sliding cover 28 can be biased to the closed position in some embodiments.

The heating chamber 18, and specifically the cavity 20, is arranged to receive a correspondingly shaped generally cylindrical or rod-shaped aerosol generating article 100. Typically, the aerosol generating article 100 comprises a pre-packaged aerosol generating substrate 102. The aerosol generating article 100 is a disposable and replaceable article (also known as a "consumable") which may, for example, contain tobacco as the aerosol generating substrate 102. The aerosol generating article 100 has a proximal end 104 (or mouth end) and a distal end 106. The aerosol generating article 100 further comprises a mouthpiece segment 108 positioned downstream of the aerosol generating substrate 102. The aerosol generating substrate 102 and the mouthpiece segment 108 are arranged in coaxial alignment inside a wrapper 110 (e.g., a paper wrapper) to hold the components in position to form the rod-shaped aerosol generating article 100.

The mouthpiece segment 108 can comprise one or more of the following components (not shown in detail) arranged sequentially and in co-axial alignment in a downstream direction, in other words from the distal end 106 towards the proximal (mouth) end 104 of the aerosol generating article 100: a cooling segment, a center hole segment and a filter segment. The cooling segment typically comprises a hollow paper tube having a thickness which is greater than the thickness of the wrapper 110. The center hole segment may comprise a cured mixture containing cellulose acetate fibres and a plasticizer, and functions to increase the strength of the mouthpiece segment 108. The filter segment typically comprises cellulose acetate fibres and acts as a mouthpiece filter. As heated vapour flows from the aerosol generating substrate 102 towards the proximal (mouth) end 104 of the aerosol generating article 100, the vapour cools and condenses as it passes through the cooling segment and the center hole segment to form an aerosol with suitable characteristics for inhalation by a user through the filter segment.

The heating chamber 18 has a side wall (or chamber wall) 30 extending between a base 32, located at a second end 34 of the heating chamber 18, and the open first end 26. The side wall 30 and the base 32 are connected to each other and can be integrally formed as a single piece. In the illustrated embodiment, the side wall 30 is tubular and, more specifically, cylindrical. In other embodiments, the side wall 30 can have other suitable shapes, such as a tube with an elliptical or polygonal cross section. In yet further embodiments, the side wall 30 can be tapered.

In the illustrated embodiment, the base 32 of the heating chamber 18 is closed, e.g. sealed or air-tight. That is, the heating chamber 18 is cup-shaped. This can ensure that air drawn from the open first end 26 is prevented by the base 32 from flowing out of the second end 34 and is instead guided through the aerosol generating substrate 102. It can also ensure that a user inserts the aerosol generating article 100 into the heating chamber 18 an intended distance and no further.

The side wall 30 of the heating chamber 18 has an inner surface 36 and an outer surface 38. A plurality of susceptor mounts 40 are formed in the inner surface 36 and are circumferentially spaced around the inner surface 36. The aerosol generating device 10 comprises a plurality of inductively heatable susceptors 42 mounted on the susceptor mounts 40 and, thus, the inductively heatable susceptors 42 are circumferentially spaced around a periphery 44 of the heating chamber 18.

Figure 3:
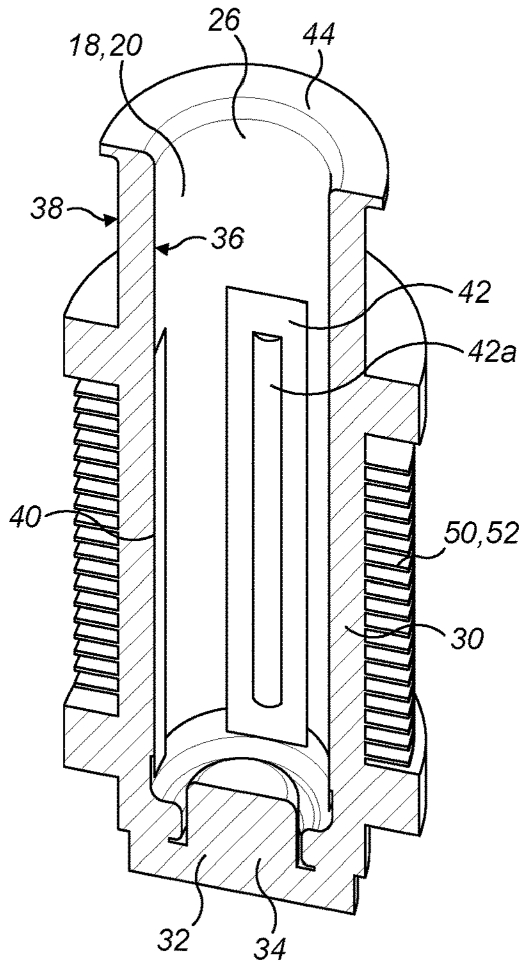
FIG. 3 is a detailed diagrammatic perspective view of the heating chamber of the aerosol generating device of FIGS. 1 and 2, showing one of a plurality of inductively heatable susceptors mounted on an inner surface of the heating chamber and a coil support structure.
Figure 4:
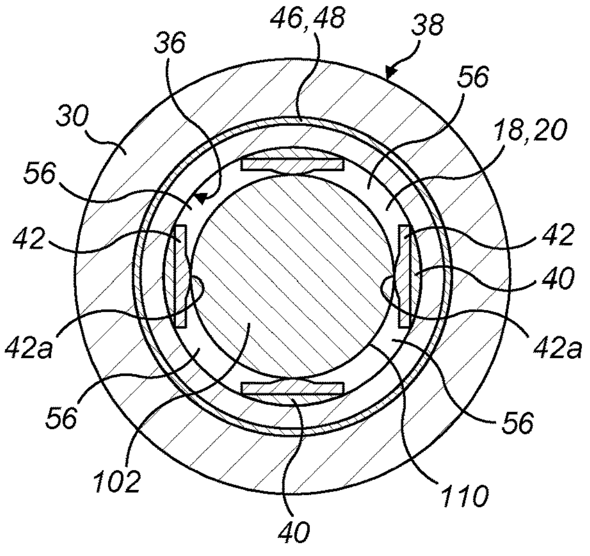
FIG. 4 is a diagrammatic cross-sectional view from an end of the heating chamber shown in FIG. 3, showing a plurality of inductively heatable susceptors spaced around a periphery of the heating chamber.
Figure 5:
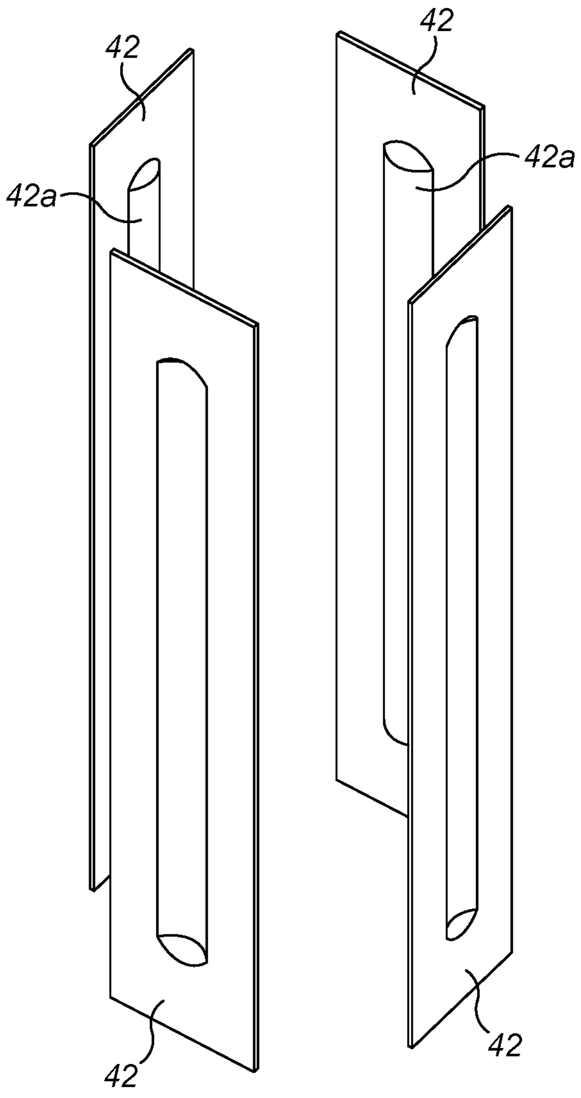
FIG. 5 is a diagrammatic view showing the detail of the inductively heatable susceptors of FIGS. 3 and 4.
Figure 6:
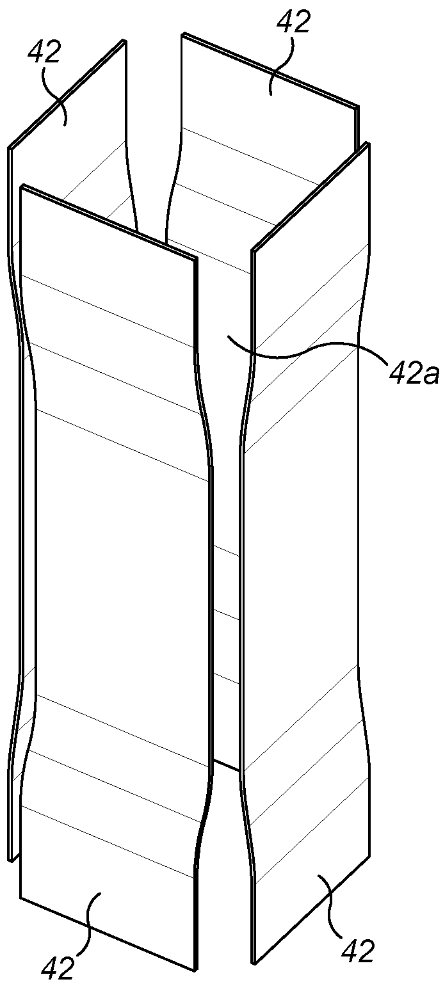
FIG. 6 is a diagrammatic view similar to FIGS. 5 and 6, showing inductively heatable susceptors with an alternative geometry.

The inductively heatable susceptors 42 are elongate in the longitudinal direction of the heating chamber 18. Each inductively heatable susceptor 42 has a length and a width, and typically the length is at least five times the width. Each inductively heatable susceptor 42 has an inwardly extending portion 42*a* that extends into the heating chamber 18, in a radial direction from the side wall 30. The inwardly extending portion 42*a* can comprise an elongate ridge as shown in FIGS. 3 to 5 or can comprise an inwardly deflected portion as shown in FIG. 6. In both cases, the inwardly extending portions 42*a* are formed easily during fabrication of the inductively heatable susceptors 42. It will be understood by one of ordinary skill in the art that the inwardly extending portions 42*a* are not limited to the geometries shown in FIGS. 3 to 5 and 6 and that other geometries are entirely within the scope of the present disclosure.

The inwardly extending portions 42*a* extend towards and contact the aerosol generating substrate 102 as shown in FIG. 4. The inwardly extending portions 42*a* extend radially inwardly into the heating chamber 18 by a sufficient extent to reduce the effective cross-sectional area of the heating chamber 18. The inwardly extending portions 42*a* thus form a friction fit with the aerosol generating substrate 102, and more particularly with the wrapper 110 of the aerosol generating article 100, and may cause compression of the aerosol generating substrate 102 as best seen in FIG. 2. The compression of the aerosol generating substrate 102 improves thermal conduction through the aerosol generating substrate 102, for example by eliminating air gaps, and each inwardly extending portion 42*a* may extend inwardly across the heating chamber 18 by a distance of between 3% and 7%, for example about 5% of the distance across the heating chamber 18.

The aerosol generating device 10 comprises an electromagnetic field generator 46 for generating an electromagnetic field. The electromagnetic field generator 46 comprises a substantially helical induction coil 48. The induction coil 48 has a circular cross-section and extends helically around the substantially cylindrical heating chamber 18. The induction coil 48 can be energised by the power source 22 and controller 24. The controller 24 includes, amongst other electronic components, an inverter which is arranged to convert a direct current from the power source 22 into an alternating high-frequency current for the induction coil 48.

The side wall 30 of the heating chamber 18 includes a coil support structure 50 formed in the outer surface 38. In the illustrated example, the coil support structure 50 comprises a coil support groove 52 which extends helically around the outer surface 38. The induction coil 48 is positioned in the coil support groove 52 and is, thus, securely and optimally positioned with respect to the inductively heatable susceptors 42.

In order to use the aerosol generating device 10, a user displaces the sliding cover 28 (if present) from the closed position shown in FIG. 1 to the open position shown in FIG. 2. The user then inserts an aerosol generating article 100 through the open first end 26 into the heating chamber 18, so that the aerosol generating substrate 102 is received in the cavity 20 and so that the proximal end 104 of the aerosol generating article 100 is positioned at the open first end 26 of the heating chamber 18, with at least part of the mouthpiece segment 108 projecting from the open first end 26 to permit engagement by a user's lips.

Upon activation of the aerosol generating device 10 by a user, the induction coil 48 is energised by the power source 22 and controller 24 which supply an alternating electrical current to the induction coil 48, and an alternating and time-varying electromagnetic field is thereby produced by the induction coil 48. This couples with the inductively heatable susceptors 42 and generates eddy currents and/or magnetic hysteresis losses in the susceptors 42 causing them to heat up. The heat is then transferred from the inductively heatable susceptors 42 to the aerosol generating substrate 102, for example by conduction, radiation and convection. This results in heating of the aerosol generating substrate 102 without combustion or burning, and a vapour is thereby generated. The generated vapour cools and condenses to form an aerosol which can be inhaled by a user of the aerosol generating device 10 through the mouthpiece segment 108, and more particularly through the filter segment.

The vaporisation of the aerosol generating substrate 102 is facilitated by the addition of air from the surrounding environment, for example through the open first end 26 of the heating chamber 18, the air being heated as it flows between the wrapper 110 of the aerosol generating article 100 and the inner surface 36 of the side wall 30. More particularly, when a user sucks on the filter segment, air is drawn into the heating chamber 18 through the open first end 26 as illustrated by the arrows A in FIG. 2. The air entering the heating chamber 18 flows from the open first end 26 towards the closed second end 34, between the wrapper 110 and the inner surface 36 of the side wall 30. As noted above, the inwardly extending portions 42*a* extend into the heating chamber 18 by a sufficient distance to at least contact the outer surface of the aerosol generating article 100, and typically to cause at least some degree of compression of the aerosol generating article 100. Consequently, there is no air gap all the way around the heating chamber 18 in the circumferential direction. Instead, there are air flow paths 56 in the circumferential regions (four equally spaced gap regions) between the inwardly extending portions 42*a* along which air flows from the open first end 26 towards the closed second end 34 of the heating chamber 18. In some examples, there may be more or less than four inwardly extending portions 42*a* and, thus, a corresponding number of air flow paths 56 formed by the gap regions between the inwardly extending portions 42*a*. When the air reaches the closed second end 34 of the heating chamber 18, it turns through approximately 180° and enters the distal end 106 of the aerosol generating article 100. The air is then drawn through the aerosol generating article 100 as illustrated by the arrow B in FIG. 2, from the distal end 106 towards the proximal (mouth) end 104 along with the generated vapour.

A user can continue to inhale aerosol all the time that the aerosol generating substrate 102 is able to continue to produce a vapour, e.g. all the time that the aerosol generating substrate 102 has vaporisable components left to vaporise into a suitable vapour. The controller 24 can adjust the magnitude of the alternating electrical current passed through the induction coil 48 to ensure that the temperature of the inductively heatable susceptors 42, and in turn the temperature of the aerosol generating substrate 102, does not exceed a threshold level. Specifically, at a particular temperature, which depends on the constitution of the aerosol generating substrate 102, the aerosol generating substrate 102 will begin to burn. This is not a desirable effect and temperatures above and at this temperature are avoided.

To assist with this, in some examples the aerosol generating device 10 is provided with a temperature sensor (not shown). The controller 24 is arranged to receive an indication of the temperature of the aerosol generating substrate 102 from the temperature sensor and to use the temperature indication to control the magnitude of the alternating electrical current supplied to the induction coil 48. In one example, the controller 24 may supply a first magnitude of electrical current to the induction coil 48 for a first time period to heat the inductively heatable susceptors 42 to a first temperature. Subsequently, the controller 24 may supply a second magnitude of alternating electrical current to the induction coil 48 for a second time period to heat the inductively heatable susceptors 42 to a second temperature. The second temperature may be lower than the first temperature. Subsequently, the controller 24 may supply a third magnitude of alternating electrical current to the induction coil 48 for a third time period to heat the inductively heatable susceptors 42 to the first temperature again. This may continue until the aerosol generating substrate 102 is expended (i.e. all vapour which can be generated by heating has already been generated) or the user stops using the aerosol generating device 10. In another scenario, once the first temperature has been reached, the controller 24 can reduce the magnitude of the alternating electrical current supplied to the induction coil 48 to maintain the aerosol generating substrate 102 at the first temperature throughout a session.

A single inhalation by a user is generally referred to a "puff". In some scenarios, it is desirable to emulate a cigarette smoking experience, which means that the aerosol generating device 10 is typically capable of holding sufficient aerosol generating substrate 102 to provide ten to fifteen puffs.

In some embodiments, the controller 24 is configured to count puffs and to interrupt the supply electrical current to the induction coil 48 after ten to fifteen puffs have been taken by a user. Puff counting can be performed in a variety of different ways. In some embodiments, the controller 24 determines when a temperature decreases during a puff, as fresh, cool air flows past the temperature sensor (not shown), causing cooling which is detected by the temperature sensor. In other embodiments, air flow is detected directly using a flow detector. Other suitable methods will be apparent to one of ordinary skill in the art. In other embodiments, the controller 24 additionally or alternatively interrupts the supply of electrical current to the induction coil 48 after a predetermined amount of time has elapsed since a first puff. This can help to both reduce power consumption and provide a back-up for switching off the aerosol generating device 10 in the event that the puff counter fails to correctly register that a predetermined number of puffs has been taken.

In some examples, the controller 24 is configured to supply an alternating electrical current to the induction coil 48 so that it follows a predetermined heating cycle, which takes a predetermined amount of time to complete. Once the cycle is complete, the controller 24 interrupts the supply of electrical current to the induction coil 48. In some cases, this cycle may make use of a feedback loop between the controller 24 and a temperature sensor (not shown). For example, the heating cycle may be parameterised by a series of temperatures to which the inductively heatable susceptors 42 (or, more specifically the temperature sensor) are heated or allowed to cool. The temperatures and durations of such a heating cycle can be empirically determined to optimise the temperature of the aerosol generating substrate 102. This may be necessary as direct measurement of the temperature of the aerosol generating substrate 102 can be impractical, or misleading, for example where the outer layer of substrate is a different temperature to the core.

The power source 22 is sufficient to at least bring the aerosol generating substrate 102 in a single aerosol generating article 100 up to the first temperature and maintain it at the first temperature to provide sufficient vapour for at least ten to fifteen puffs. More generally, in line with emulating the experience of cigarette smoking, the power source 22 is usually sufficient to repeat this cycle (bring the aerosol generating substrate 102 up to the first temperature, maintain the first temperature and vapour generation for ten to fifteen puffs) ten times, or even twenty times, thereby emulating a user's experience of smoking a packet of cigarettes, before there is a need to replace or recharge the power source 22.

In general, the efficiency of the aerosol generating device 10 is improved when as much as possible of the heat that is generated by the inductively heatable susceptors 42 results in heating of the aerosol generating substrate 102. To this end, the aerosol generating device 10 is usually configured to provide heat in a controlled manner to the aerosol generating substrate 102 while reducing heat flow to other parts of the aerosol generating device 10. In particular, heat flow to parts of the aerosol generating device 10 that the user handles is kept to a minimum, thereby keeping these parts cool and comfortable to hold.

Figure 7:
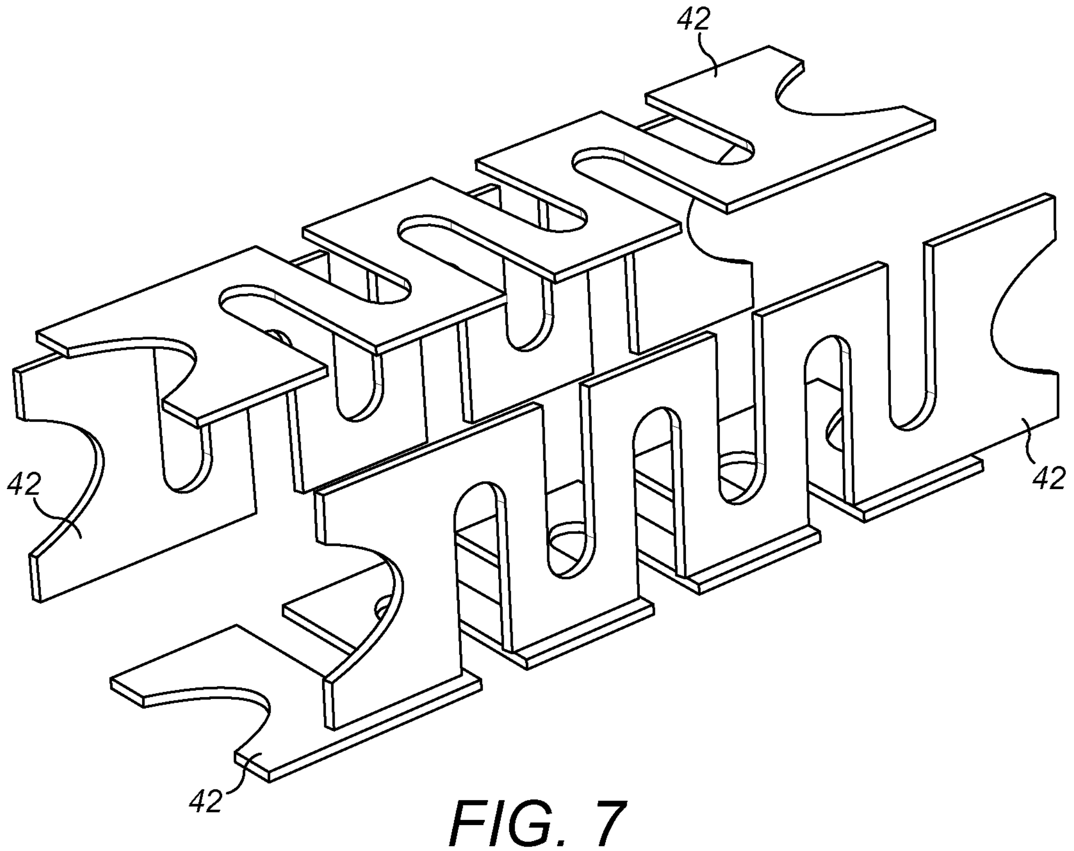
FIG. 7 is a diagrammatic view similar to FIG. 5, showing inductively heatable susceptors with another alternative geometry.

Referring now to FIG. 7, there is shown another example of elongate inductively heatable susceptors 42 which have a serpentine geometry. The serpentine geometry tends to improve the flexibility of the inductively heatable susceptors 42, thereby helping to reduce the total amount of expansion and contraction of each susceptor 42 as the temperature increases and decreases. A similar effect could be achieved by using inductively heatable susceptors 42 having a zig zag geometry.

Figure 8:
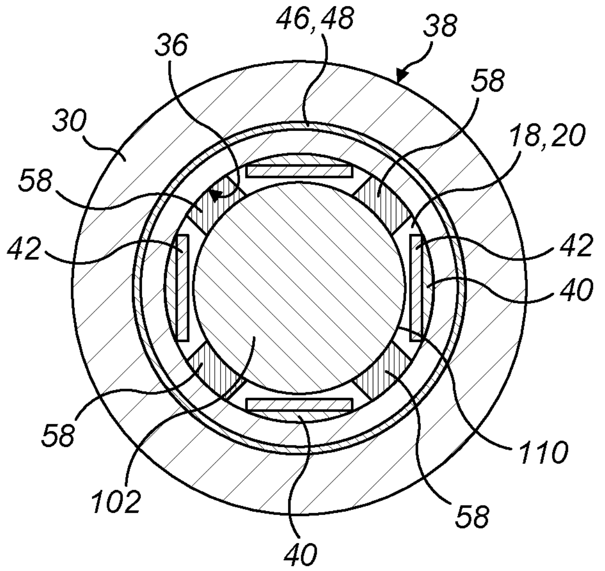
FIG. 8 is a diagrammatic cross-sectional view similar to FIG. 4, showing an arrangement in which the inductively heatable susceptors are spaced from an aerosol generating substrate of the aerosol generating article.

Referring now to FIG. 8, in another example the elongate inductively heatable susceptors 42 may be spaced from the aerosol generating substrate 102 so that air can flow from the open first end 26 towards the closed second end 34 of the heating chamber 18 between the inductively heatable susceptors 42 and the wrapper 110 surrounding the aerosol generating substrate 102. In this example, the inductively heatable susceptors 42 may have a substantially planar surface facing the aerosol generating substrate 102. For example, the planar surface could be obtained by omitting the inwardly extending portions 42*a* from the inductively heatable susceptors 42 described above with reference to FIGS. 5 and 6 or by adopting inductively heatable susceptors 42 with a serpentine geometry as described above with reference to FIG. 7. As the air flows from the open first end 26 towards the closed second end 34 of the heating chamber 18 between the inductively heatable susceptors 42 and the wrapper 110 surrounding the aerosol generating substrate 102, it is heated by the inductively heatable susceptors 42. The preheated air enters the distal end 106 of the aerosol generating article 100, thereby convectively heating the aerosol generating substrate 102 as the air flows through it.

It will be understood that there is no conductive heating of the aerosol generating substrate 102 in the example of FIG. 8 due to the absence of direct contact between the aerosol generating substrate 102 and the inductively heatable susceptors 42, although some radiative heating may occur in addition to the convective heating described above. This may advantageously help to avoid local overheating and scorching of the wrapper 110 and/or aerosol generating substrate 102. Since there is no direct contact between the inductively heatable susceptors 42 and the aerosol generating substrate 102, it may be advantageous to provide a plurality of circumferentially spaced elongate support ribs 58 on the side wall 30 of the heating chamber 18 to hold the aerosol generating article 100 in position in the heating chamber 18 and optionally to provide some compression of the aerosol generating substrate 102.

Figure 9:
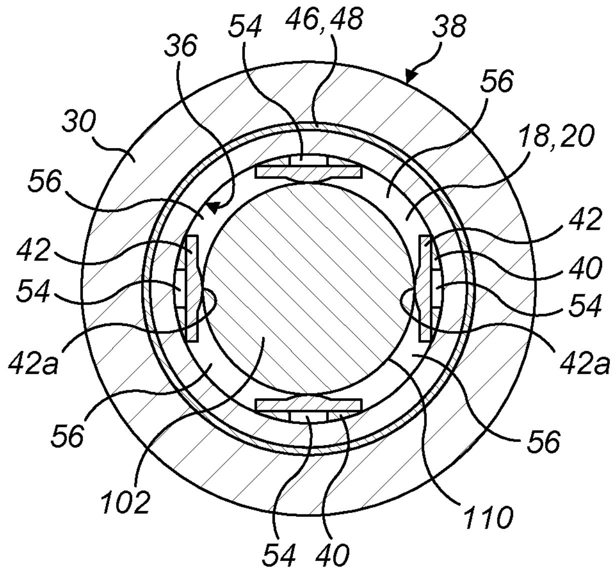
FIG. 9 is a diagrammatic cross-sectional view similar to FIG. 4, showing airflow channels formed within susceptor mounts.

Referring now to FIG. 9, in some examples airflow channels 54 can be provided between the inductively heatable susceptors 42 and the inner surface 36 of the side wall 30 of the heating chamber 18, in addition to the air flow paths 56 in the circumferential regions as described above with reference to FIG. 4. The airflow channels 54 can, for example, be provided by through-holes formed in the susceptor mounts 40. The airflow channels 54 provide another route for air to flow from the open first end 26 towards the closed second end 34 of the heating chamber 18. It will be understood that as the air flows along the airflow channels 54, it is heated by the inductively heatable susceptors 42. Thus, an increased volume of pre-heated air can enter the distal end 106 of the aerosol generating article 100, thereby enhancing the convective heating of the aerosol generating substrate 102 in addition to the conductive heating that is provided by the direct contact between the inwardly extending portions 42*a* of the susceptors 42 and the aerosol generating substrate 102.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating device comprising:

a heating chamber for receiving at least part of an aerosol generating substrate; and a plurality of inductively heatable susceptors spaced around a periphery of the heating chamber, wherein the heating chamber comprises a chamber wall defining an interior volume of the heating chamber, and the plurality of inductively heatable susceptors are spaced around an inner surface of the chamber wall, and wherein the heating chamber includes a plurality of elongated support ribs spaced circumferentially around the inner surface of the chamber wall and the plurality of circumferentially spaced elongated support ribs provide the heating chamber with a reduced cross-sectional area and are configured to form a friction fit with an aerosol generating substrate positioned, in use, in the heating chamber.

2. The aerosol generating device according to claim 1, wherein the chamber wall includes a plurality of susceptor mounts formed in or on the inner surface for mounting the plurality of inductively heatable susceptors.

3. The aerosol generating device according to claim 2, wherein the plurality of susceptor mounts define an airflow channel through which air can flow from a first open end of the heating chamber to a second closed end of the heating chamber.

4. The aerosol generating device according to claim 1, wherein the chamber wall includes a coil support structure formed in or on an outer surface for supporting an induction heating coil of an electromagnetic field generator.

5. The aerosol generating device according to claim 4, wherein the coil support structure comprises a coil support groove extending helically around the outer surface of the chamber wall.

6. The aerosol generating device according to claim 1, wherein the heating chamber is substantially tubular and the inductively heatable susceptors are spaced around the periphery of the heating chamber.

7. The aerosol generating device according to claim 1, wherein the heating chamber has a longitudinal axis defining a longitudinal direction and each of the inductively heatable susceptors is elongate in the longitudinal direction of the heating chamber.

8. The aerosol generating device according to claim 7, wherein each of the inductively heatable susceptors has a length and a width and the length is at least five times the width.

9. The aerosol generating device according to claim 1, wherein the heating chamber comprises a substantially non-electrically conductive and non-magnetically permeable material.

10. The aerosol generating device according to claim 9, wherein the heating chamber comprises a heat-resistant plastics material.

11. The aerosol generating device according to claim 10, wherein the heat-resistant plastics material comprises a polyether ether ketone (PEEK).

12. An aerosol generating system comprising:

an aerosol generating substrate; and an aerosol generating device comprising:

a heating chamber for receiving at least part of the aerosol generating substrate; and a plurality of inductively heatable susceptors spaced around a periphery of the heating chamber and around a periphery of the aerosol generating substrate for heating the aerosol generating substrate, wherein the heating chamber comprises a chamber wall defining an interior volume of the heating chamber, and the plurality of inductively heatable susceptors are spaced around an inner surface of the chamber wall, and wherein the heating chamber includes a plurality of elongated support ribs spaced circumferentially around the inner surface of the chamber wall and the plurality of circumferentially spaced elongated support ribs provide the heating chamber with a reduced cross-sectional area and are configured to form a friction fit with an aerosol generating substrate positioned, in use, in the heating chamber.

13. The aerosol generating system according to claim 12, wherein the chamber wall includes a plurality of susceptor mounts formed in or on the inner surface for mounting the plurality of inductively heatable susceptors and the plurality of susceptor mounts define an airflow channel through which air can flow from a first open end of the heating chamber to a second closed end of the heating chamber.

14. An aerosol generating device comprising:

a heating chamber for receiving at least part of an aerosol generating substrate;

a plurality of inductively heatable susceptors spaced around a periphery of the heating chamber, wherein the heating chamber comprises a chamber wall defining an interior volume of the heating chamber, and the plurality of inductively heatable susceptors are spaced around an inner surface of the chamber wall, and wherein at least one of the inductively heatable susceptors has at least one inwardly extending portion that extends into the heating chamber from an inner surface of the chamber wall to provide a reduced cross-sectional area of the heating chamber and thereby compress an aerosol generating substrate positioned, in use, in the heating chamber.

15. The aerosol generating device according to claim 14, wherein the chamber wall includes a plurality of susceptor mounts formed in or on the inner surface for mounting the plurality of inductively heatable susceptors.

16. The aerosol generating device according to claim 15, wherein the plurality of susceptor mounts define an airflow channel through which air can flow from a first open end of the heating chamber to a second closed end of the heating chamber.

17. An aerosol generating system comprising:

an aerosol generating substrate; and the aerosol generating device of claim 14.

* * * * *